A. G. JACOBS.
TRANSPLANTER.
APPLICATION FILED JUNE 29, 1910.

985,596.

Patented Feb. 28, 1911.

WITNESSES:
Samuel E. Wade
C. E. Trainor

INVENTOR
AUGUSTUS G. JACOBS
BY Munn & Co.
ATTORNEYS

UNITED STATES PATENT OFFICE.

AUGUSTUS G. JACOBS, OF JONESTOWN, MISSISSIPPI, ASSIGNOR TO A. G. JACOBS COTTON TRANSPLANTER COMPANY, OF JONESTOWN, MISSISSIPPI, A CORPORATION OF MISSISSIPPI.

TRANSPLANTER.

985,596.

Specification of Letters Patent. Patented Feb. 28, 1911.

Application filed June 29, 1910. Serial No. 569,481.

*To all whom it may concern:*

Be it known that I, AUGUSTUS G. JACOBS, a citizen of the United States, and a resident of Jonestown, in the county of Coahoma and State of Mississippi, have invented certain new and useful Improvements in Transplanters, of which the following is a specification.

My invention is an improvement in transplanters, and consists in certain novel constructions, and combinations of parts, hereinafter described and claimed.

The object of the invention is to provide a simple and inexpensive device of the character specified, by means of which the plant, together with a sufficient amount of the soil to insure the life of the plant, may be transplanted from one point to another.

Figure 1:
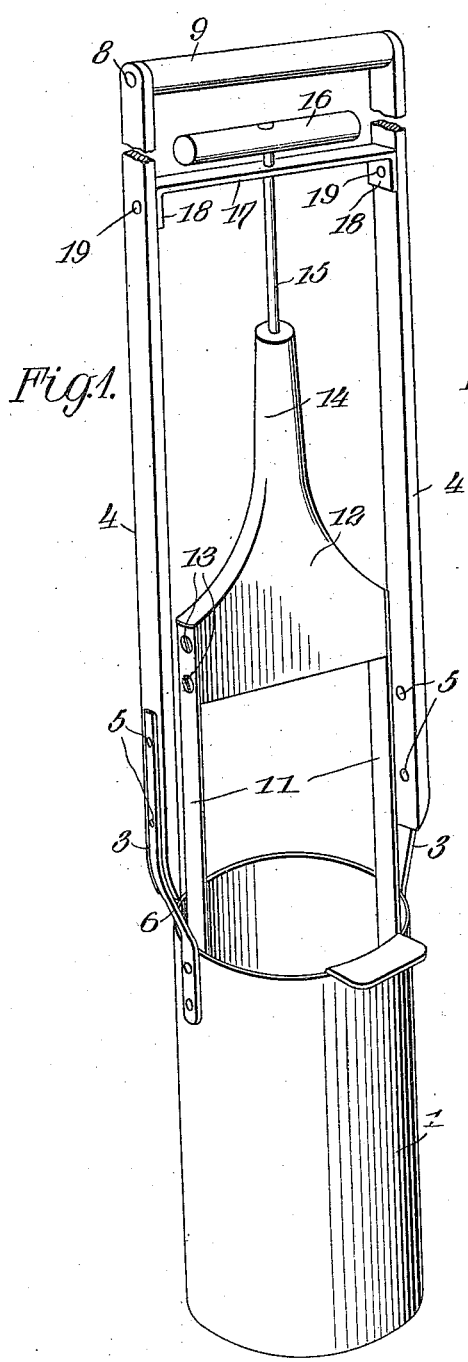
Figure 2:
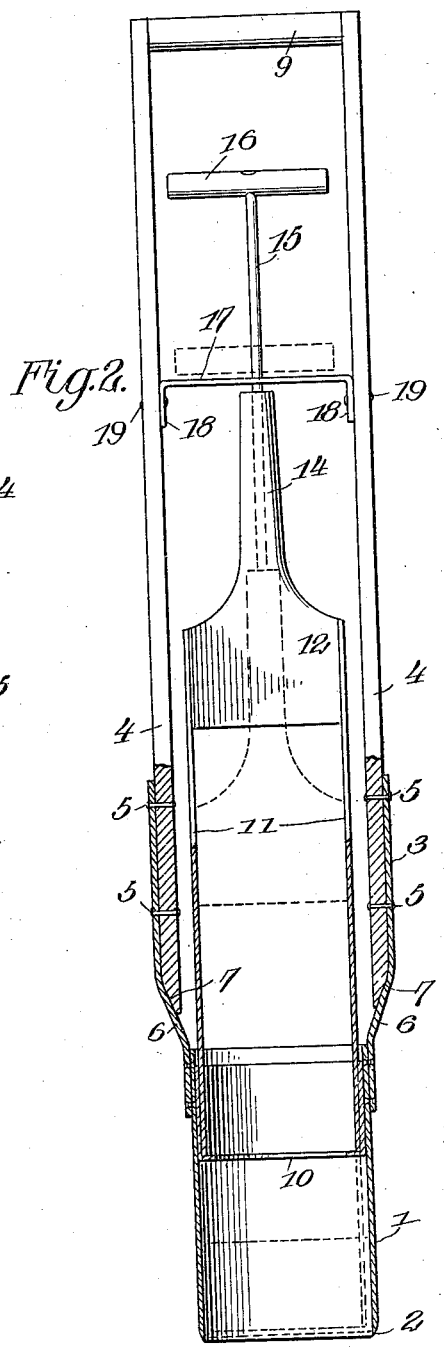

Referring to the drawings forming a part hereof Figure 1 is a perspective view of the improvement, and Fig. 2 is a vertical section of the same.

The embodiment of the invention shown in the drawings, comprises a shell 1, substantially circular in cross section, and having its lower edge sharpened as at 2. A plurality of straps 3 is riveted to the upper edge of the shell at diametrically opposite points, and to the upper end of each strap a bar 4, preferably of wood, is secured, by rivets 5.

Each strap is offset outwardly at the free upper edge of the shell, as shown at 6, and the lower end of the bar is beveled at 7, to fit the offset. The bars are connected by a rod 8 at their upper ends, and a roller 9 is arranged on the rod, the roller forming a handle.

A ring 10 is slidable in the shell, and the ring is provided at diametrically opposite points, with integral straps 11 extending upwardly inside of the bars 4, and the upper ends of the straps are secured to the sides of a plate or block 12 by screws 13.

The block is preferably of wood and is provided at its center with an upwardly extending lug 14, preferably rounded as shown. A rod 15 is secured in the lug, extending longitudinally thereof, and a handle 16 is secured to the free end of the rod, and is arranged transversely thereof.

A cross bar 17 is arranged between the bars 4, near the roller 9, and the ends of the cross bar are bent laterally to form lugs 18, and the lugs rest against the bars 4, and are secured thereto by rivets 19. The bar is provided with a transverse opening at its center, and the rod 15 passes through the opening, the bar thus acting as a guide for the rod.

In operation, the shell is placed on the ground in vertical position, and with the plant extending upwardly into the same. The ring 10 is lifted as shown in Fig. 2, until the end of the lug 14 engages the cross bar 17. The shell is now forced into the ground by the handle 9, until the lower edge of the shell is below the roots of the plant. The cylinder of earth is then loosened by moving the shell gently from side to side, and the plant and cylinder are lifted.

A hole having been made to receive the plant, the shell with the plant and cylinder is inserted in the hole, and the handle 16 is grasped and held firmly, while the cylinder is drawn upward by the roller 9. The cylinder is thus pushed out of the shell, and the plant is transplanted with the ball of soil in which its roots are embedded.

The bars and straps connected with the shell form a frame, and the ring is provided with the rod for moving the same. The cross bar is a guide for the rod, and the handle and end of the block or lug act as stops to limit the movement of the ring.

I claim:—

A device of the character specified, comprising a shell having one end sharpened, a strap secured to each side of the shell at the opposite end, the straps being offset outwardly from the shell, a bar secured to the offset portion of each strap, a rod connecting the ends of the bars, a roller on the rod, a ring slidable in the shell, a strap connected with each side of the ring, a block or plate to which the straps are connected, a rod connected with the block and extending between the bars in substantial parallelism therewith, a handle on the rod, and a cross bar connecting the bars intermediate their ends and having an opening through which the rod passes, the handle on the rod and the block limiting the movement of the ring by their engagement with the cross bar.

AUGUSTUS G. JACOBS.

Witnesses:
W. B. WISE,
B. E. McCULLOUGH.

Copies of this patent may be obtained for five cents each, by addressing the "Commissioner of Patents, Washington, D. C."